(12) United States Patent
Abedian et al.

(10) Patent No.: US 6,338,560 B1
(45) Date of Patent: Jan. 15, 2002

(54) SELF-CLEANING ROTATING MIRRORS

(75) Inventors: Behrouz Abedian, Lincoln; Michael C. Swarden, Cambridge, both of MA (US)

(73) Assignee: Tufts University, Boston, MA (US)

( * ) Notice: Subject to any disclaimer, the term of this patent is extended or adjusted under 35 U.S.C. 154(b) by 0 days.

(21) Appl. No.: 09/428,797

(22) Filed: Oct. 28, 1999

(51) Int. Cl.[7] .............................. G02B 7/00; A47L 1/00
(52) U.S. Cl. ................. 359/508; 359/509; 15/250.22
(58) Field of Search ................... 359/507, 508, 359/509, 198, 199; 15/250.22, 250.001, 250.201

(56) References Cited

U.S. PATENT DOCUMENTS

| | | | |
|---|---|---|---|
| 4,261,637 A | * 4/1981 | King | 359/508 |
| 4,691,998 A | * 9/1987 | Sakagaito et al. | 359/216 |
| 4,905,644 A | 3/1990 | Masclet | 123/196 A |
| 4,906,262 A | 3/1990 | Nelson et al. | 55/290 |
| 4,929,072 A | 5/1990 | Fujie et al. | 350/582 |
| 5,171,337 A | 12/1992 | Pollock | 55/284 |
| 5,217,510 A | 6/1993 | Logan et al. | 55/101 |
| 5,419,972 A | 5/1995 | Kawaguchi et al. | 428/626 |
| 5,622,595 A | 4/1997 | Gupta et al. | 438/710 |

FOREIGN PATENT DOCUMENTS

| | | |
|---|---|---|
| JP | 61-25121 | 2/1986 |
| JP | 61-97620 | 5/1986 |
| JP | 8-5947 | 1/1996 |
| RU | 2049340 | 11/1995 |

* cited by examiner

*Primary Examiner*—Cassandra Spyrou
*Assistant Examiner*—Jarea Treas
(74) *Attorney, Agent, or Firm*—Fish & Richardson P.C.

(57) ABSTRACT

A self-cleaning, rotating mirror includes a compressor assembly mounted to a cylinder of a rotating mirror. As the cylinder and mirror rotate, the compressor assembly also rotates causing a continuous flow of clean air to be passed over the surface of the mirror, thereby preventing particles, such as dust, from depositing on the mirror surface.

28 Claims, 11 Drawing Sheets

SELF-CLEANING ROTATING MIRRORS

FIELD OF THE INVENTION

The invention relates to self-cleaning rotating mirrors.

BACKGROUND OF THE INVENTION

Rotating mirrors have become key optical components in a variety of imaging systems such as photographic mechanical cameras and photolithography equipment. Typically, the rotation of the mirror redirects a laser from a fixed light source onto an imaging plate, allowing the laser to traverse the lateral dimension of the imaging plate in each rotation sequence. At the same time, however, the rotating mirror sweeps the air around it making it susceptible to particle deposition on the mirror. Particles on the mirror will have adverse effects on the quality of the redirected light causing a loss of quality in the resulting image.

SUMMARY OF THE INVENTION

The invention is based on the discovery that by creating an air flow using a filter compressor assembly directly linked with a rotating mirror and directing the resulting air flow, e.g., with a shroud, a continuous flow of clean air is passed over the surface of the mirror, preventing the deposition of particles onto the mirror surface.

In one aspect, the invention features a self-cleaning mirror including a cylindrical shaft having a mirror face at one end thereof and a longitudinal axis, and a compressor assembly arranged on the cylindrical shaft near the mirror face, such that rotation of the shaft causes air to be compressed by the compressor assembly and flowed around the mirror face.

Embodiments of this aspect of the invention can include one or more of the following. The compressor assembly can include a filter. The compressor assembly can be a centrifugal compressor, an axial flow compressor, a radial flow compressor, or a mixed flow compressor.

The compressor assembly also can be a filter impeller compressor which includes an impeller disk and a plurality of blades made from a filter material. The filter impeller compressor can have an axial flow configuration, a centrifugal flow configuration, or a radial flow configuration.

In another aspect, the invention features a self-cleaning mirror includes a cylindrical shaft having a mirror face; and a compressor assembly having an impeller disk, a plurality of blades, and a filter. The impeller disk, the plurality of blades, and the filter are fixed about the circumference of the cylindrical shaft.

Embodiments of this aspect of the invention can include one or more of the following. The compressor assembly can further include a shroud attached to the plurality of blades. The compressor assembly can be a centrifugal compressor, an axial flow compressor, a radial flow compressor, or a mixed flow compressor. The self-cleaning mirror can further include a motor having a drive mechanism and a housing, wherein a first end of the cylindrical shaft is connected to the drive mechanism. The compressor assembly can further include a shroud attached to the motor housing. The compressor assembly can further include a shroud resting on a slip mechanism fixed to the cylindrical shaft. The compressor can further include a shroud fixed to the plurality of blades. The shroud can be fixed to the impeller ring.

In another aspect, the invention features a self-cleaning mirror including a cylindrical shaft having a mirror face; and a compressor assembly having a filter impeller. The compressor assembly is attached about the circumference of the cylindrical shaft near the mirror face.

In another aspect, the invention features a method of improving rotating mirror performance by inhibiting particle deposition. The method includes the steps of providing a mirror assembly including a shaft having a mirror face at one end thereof; attaching a compressor assembly to the shaft near the mirror face; and rotating the mirror assembly and compressor assembly to cause compressed and filtered air to flow over the mirror thereby improving rotating mirror performance.

The invention provides several advantages. For instance, the self-cleaning action of the rotating mirror reduces the deposition of particles in the surrounding air onto the mirror surface resulting in less-frequent cleaning of the optical system and better clarity when using the rotating mirror assembly to create optical images. Additionally, the self-cleaning action can allow the mirror to be rotated at faster rates thereby producing a better resolution at a shorter time interval of image production without substantially increasing the rate of particle deposition on the mirror surface.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
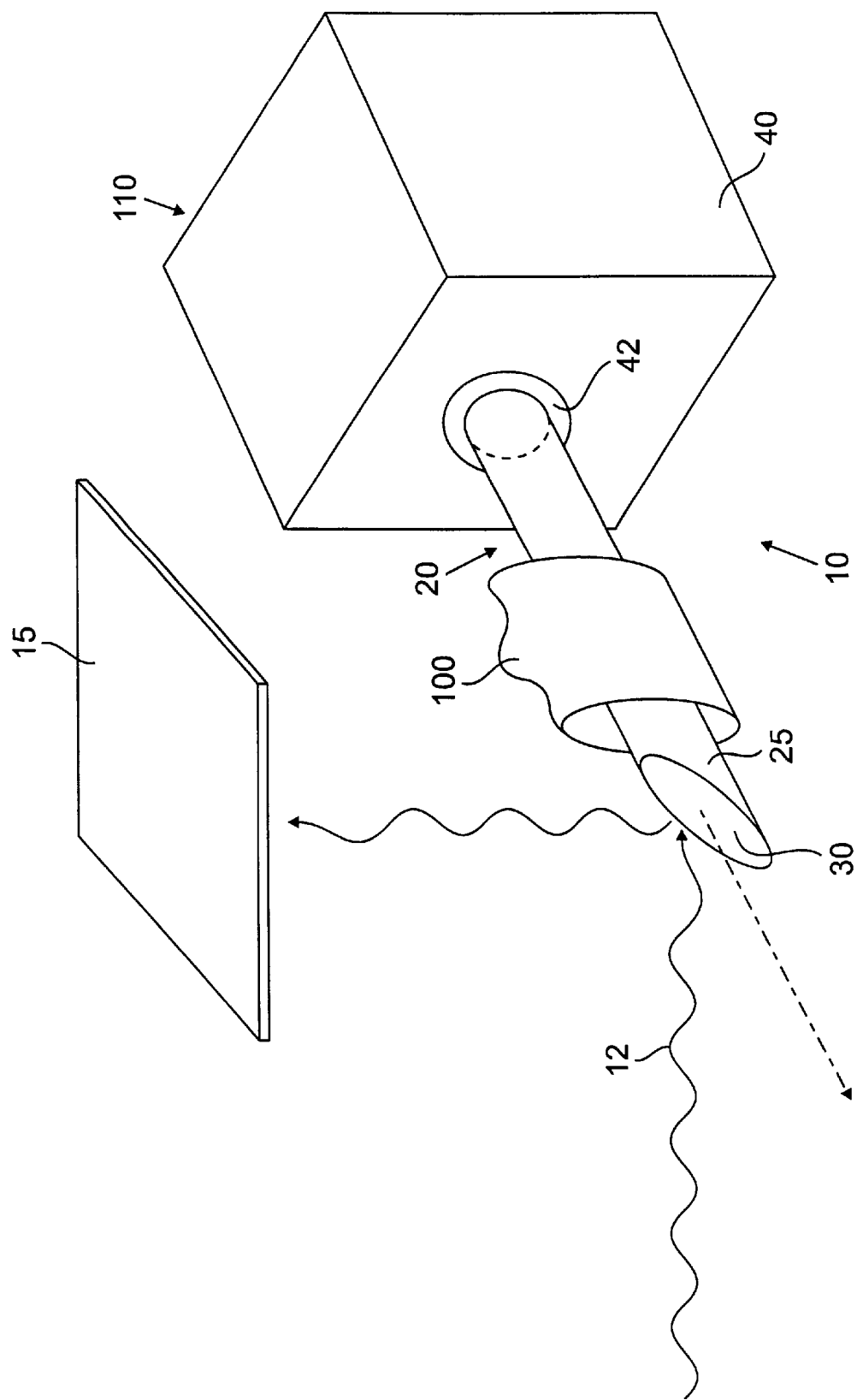
FIG. 1 is an overhead view of a self-cleaning rotating mirror.

Referring to FIG. 1, self-cleaning mirror 10 includes filter compressor 100 located on mirror assembly 20. Mirror assembly 20 includes mirror face 30 on an end of cylindrical shaft 25. Mirror face 30 is slanted at a given angle relative to the longitudinal axis L of cylindrical shaft 25 to reflect incoming laser light 12 onto an imaging plate 15. Cylindrical shaft 25 is connected to a motor 105 through an opening 42 in housing 40. Filter compressor 100 is attached about the circumference of cylindrical shaft 25 near mirror face 30.

Figure 2:
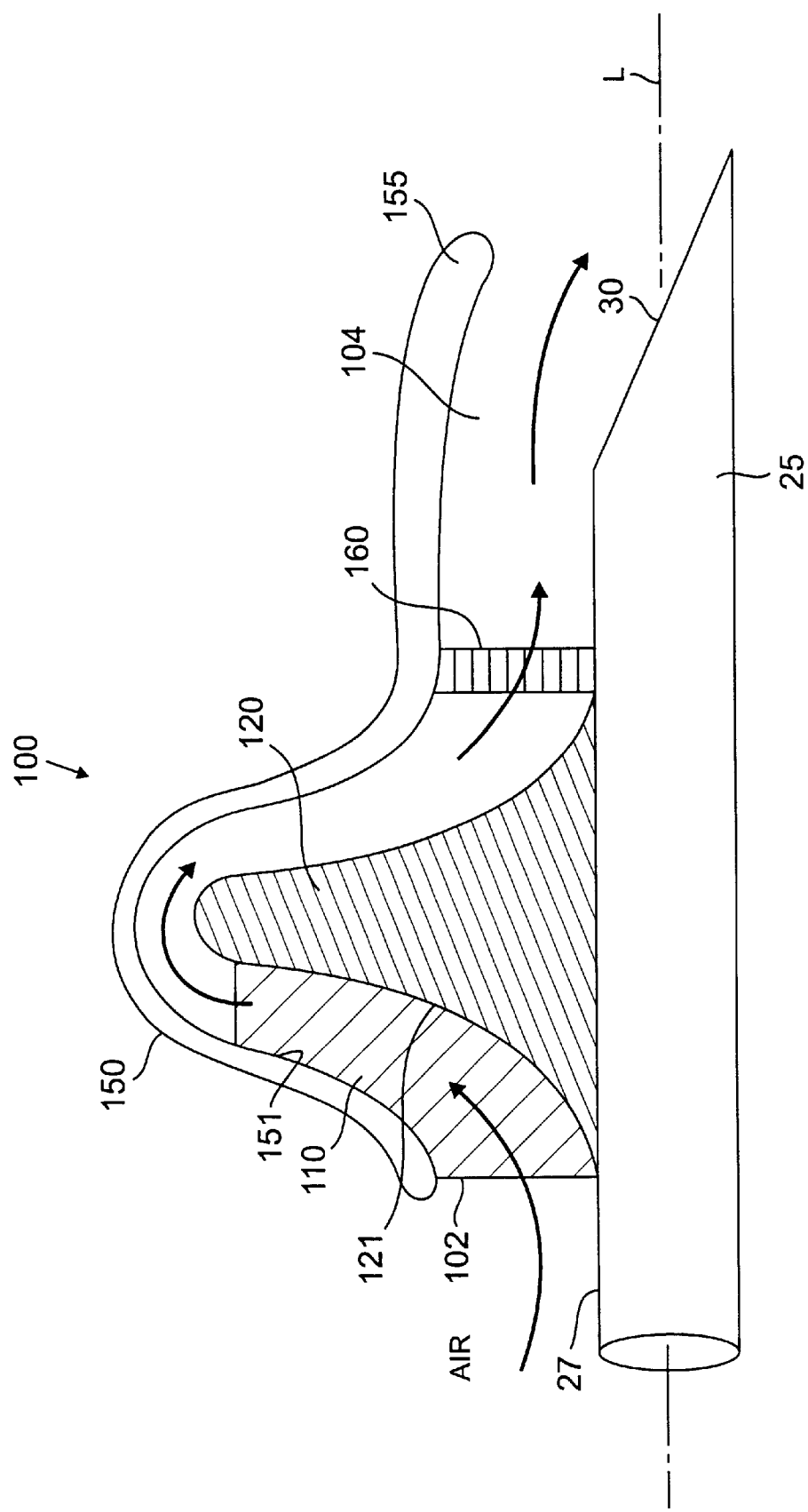
FIG. 2 is a cross-sectional view of a self-cleaning mirror including a centrifugal compressor.

Referring now to FIG. 2, filter compressor 100 includes impeller disk 120, blade 110, shroud 150, and filter assembly 160. Impeller disk 120 is attached to surface 27 of cylindrical shaft 25. Blades 110 are attached within input end 102, both to surface 121 of impeller disk 120 and inner surface 151 of shroud 150. Typically, filter compressor 100 includes between about 10 and 40 impeller blades equally spaced about the circumference of cylindrical shaft 25. Filter assembly 160 is attached within output end 104 both to surface 121 of impeller disk 120 and inner surface 151 of shroud 150. Additionally, filter compressor 100 can include support struts (not shown) secured between the ring blade and shroud surfaces.

Typically, the components of self-cleaning mirrors can be made of metals, ceramics, and/or plastics. In general, these materials are selected for their ability to withstand the forces associated with the rotational operation of the mirror. Regardless of the nature of the materials, the components must be fabricated and/or machined to create a balanced self-cleaning mirror. Filter materials for use in the new filter compressors include, but are not limited to, standard filter materials, such as natural and man-made microfibrous materials such as pleated barosilicate microfibers, porous ceramics, sintered metals, and fabric mesh. For added strength and durability, the filter material can be sandwiched between two metal screens.

Each component of the filter compressor, e.g., the impeller disk, the blades, the shroud, and the filter, can be attached to the cylinder shaft for system simplicity. This requirement can be accomplished with available turbomachinery design practices. For example, the impellers can be welded or riveted to the ring blades and shroud.

Filter compressor 100 operates in a fashion similar to a turbo or jet engine to achieve a boost in air pressure. In operation, motor 105 is activated to cause mirror assembly 20 and filter compressor 100 to rotate about a longitudinal axis L. Typically, cylindrical shaft 25 can rotate between about 20,000 RPM and 100,000 RPM. As filter compressor 100 rotates, shroud 150, impeller disk 120, filter assembly 160, and blades 110 also rotate. During rotation, air is forced past impellers 110; is compressed as it flows between impeller disk 120 and shroud 150; is passed through filter assembly 160 to remove particulates; and is directed towards mirror face 30 by a curve 155 in shroud 150. Alternatively, shroud 150 can include nozzles 161 (dashed lines) coupled to output end 104 to direct the air flow over the mirror face. Clean and compressed air continuously exits the compressor with an increase in static pressure thereby creating a generally cylindrical air stream which surrounds shaft 25 and mirror face 30 to inhibit the deposition of particulates on mirror face 30. For existing rotating mirrors, the thickness of the clean and compressed air stream is between about 0.1 mm and 15 mm, but can be varied to accommodate different sizes of rotating mirrors. The air stream can be interrupted so that it does not form a complete cylinder, yet it will still be effective.

Depending on the specific geometry of the rotating mirror, several types of filter compressors can be used to create clean and compressed air streams. For instance, filter compressor 100 shown in FIG. 2 is a centrifugal compressor, i.e., the air is compressed perpendicular to the direction of air intake. Other types of compressors include, for example, radial-flow compressors (FIG. 3), axial-flow compressors (FIG. 4), mixed flow compressors (FIG. 5), filter impeller compressors (FIGS. 6A and 7), stationary shroud compressors (FIG. 8), and pseudo-stationary shroud compressors (FIG. 9). In general, there are two main distinctions between filter compressors: (1) the direction in which air is taken into the filter compressor relative to the longitudinal axis of the cylindrical shaft; and (2) the direction of air discharged from the impeller relative to the air intake direction.

Figure 3A:
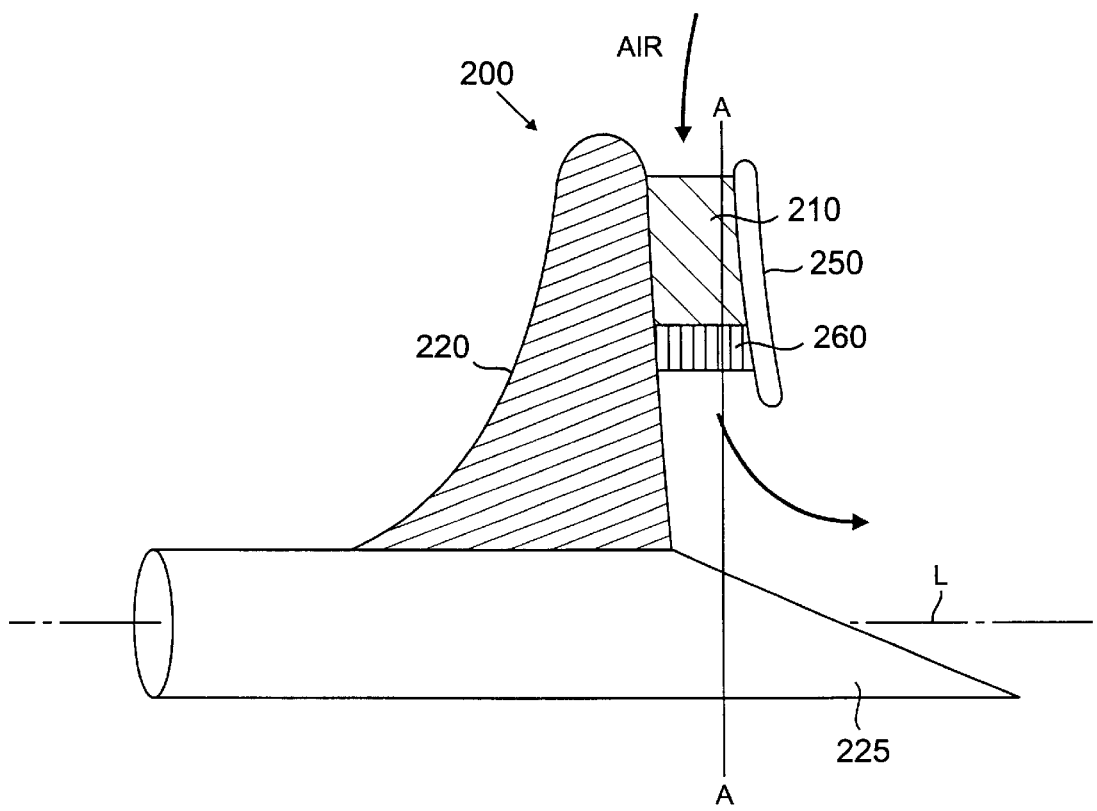
FIG. 3A is a cross-sectional view of a self-cleaning mirror including a radial-flow compressor.
Figure 3B:
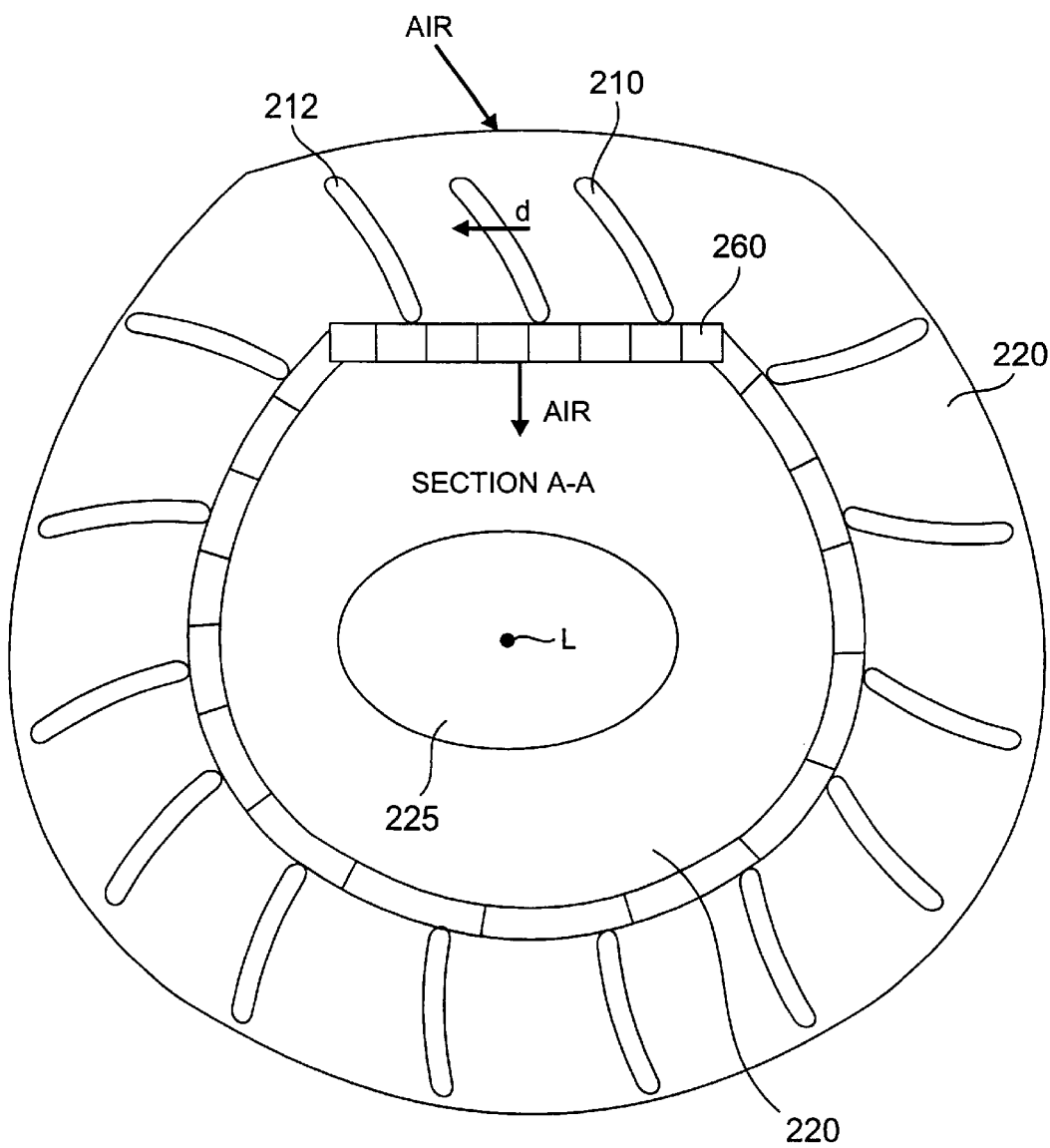
FIG. 3B is an end on, cross-sectional view of the self-cleaning mirror of FIG. 3A along section AA.

As shown in FIG. 3A, radial-flow filter compressor 200 includes all of the components found in the centrifugal compressor, e.g., impeller disk 220, blades 210, filter assembly 260, and shroud 250. FIG. 3B is an enlarged side view of blades 210 and filter assembly 260 about section AA from FIG. 3A. Blades 210 extend radially from cylindrical shaft 225 and ends 212 of the impellers are oriented parallel to longitudinal axis (L) to help push air into the compressor. The rotation of radial compressor 200 is shown by arrow (d). Air enters this filter compressor radially, i.e., at 90 degrees relative to the longitudinal axis (L) of the cylindrical shaft, and is compressed parallel to the air inflow direction.

Figure 4:
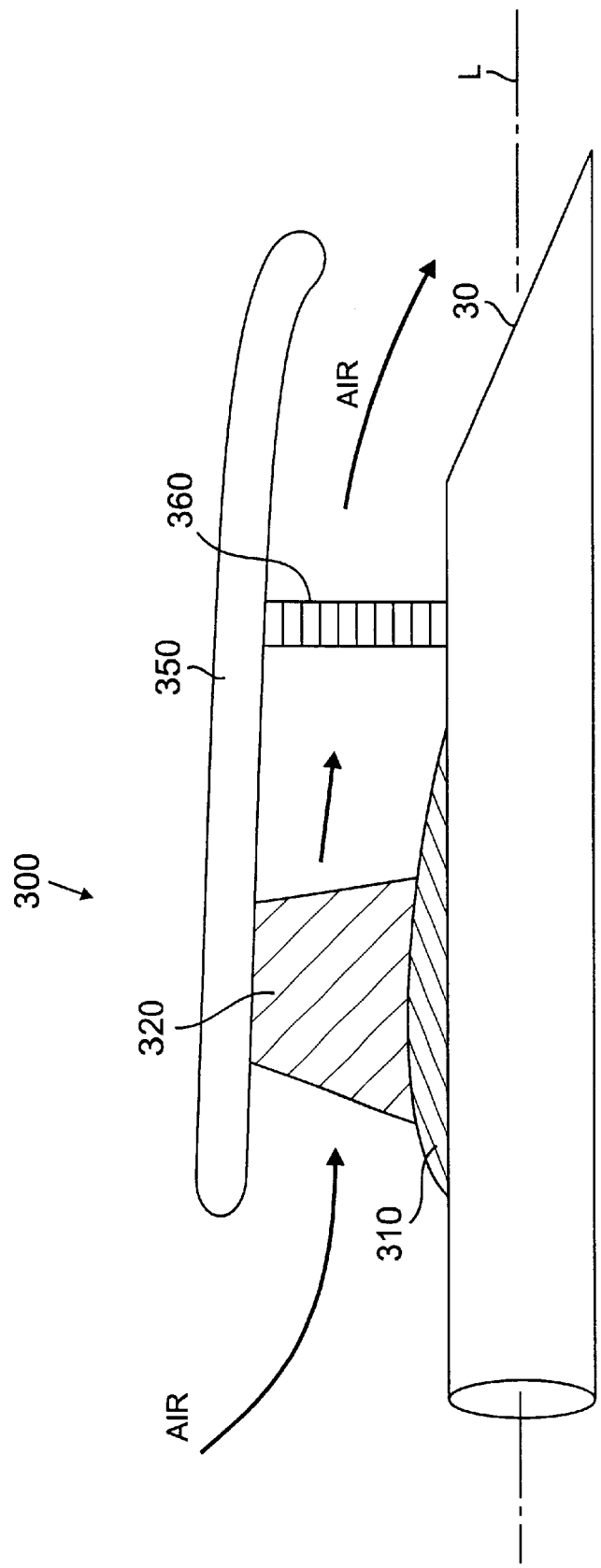
FIG. 4 is a cross-sectional view of a self-cleaning mirror including an axial-flow compressor.
Figure 5:
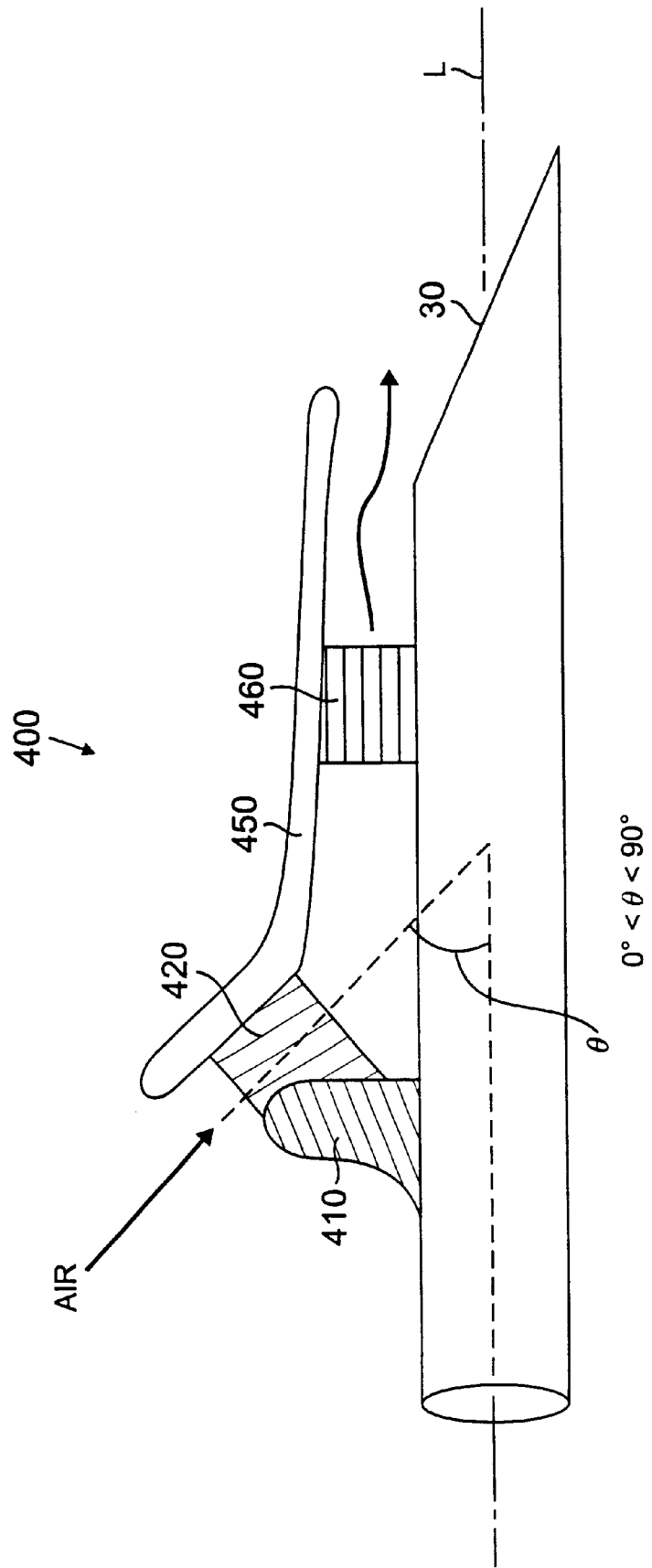
FIG. 5 is a cross-sectional view of a self-cleaning mirror including mixed-flow compressor.

As shown in FIG. 4, axial flow filter compressor 300 compresses air parallel to the inflow direction. One difference between the radial- and axial-flow filter compressor is that, unlike the radial compressor, air enters the axial flow filter compressor parallel to the longitudinal axis (L), i.e., the angle relative to the longitudinal axis (L) is zero, and is discharged in the same direction from the impeller. An axial flow filter compressor acts in a manner similar to a shrouded propeller used in propelling boats. Alternatively, in a mixed flow filter compressor 400 (See FIG. 5), air enters the filter compressor at an angle relative to the longitudinal axis (L) of the cylindrical shaft, i.e., greater than zero and less than 90, is compressed, and then discharged from the impeller at an angle relative to the longitudinal axis (L) of the cylindrical shaft, i.e., greater than zero and less than 90.

In general, the type of compressor used on a self-cleaning mirror depends upon the environment of operation, e.g., ambient pressures, density of particulates, nature of the overall device, and rotational speed. Additionally, the exact amount of air directed in a stream over the mirror surface depends on several factors, e.g., type and size of compressor, rate of rotation, and size of mirror.

The exact dimensions of the filter compressor also depend on the size and density of the particles in the air to be cleaned, and the overall pressure drop required to produce a suitable clean air stream. The impeller can be designed with standard geometry generators. Examples of standard geometry generators can be found in Whitefield and N. C. Baines, "Design of Radial Turbomachines", Longman Scientific & Technical (also John Wiley & Sons, Inc.) 1990; Staff of Lewis Research Center, "Aerodynamic Design of Axial-Flow Compressors", National Aeronautics and Space Administration, NASA SP-36, 1965; J. W. Henry and S. Rae, "Development of a Quiet Vaneless Impeller Centrifugal Pump", U.S. Marine Engineering Laboratory report MEL Report 221/66, AD649577, March 1967, each of which are herein incorporated by reference. Alternatively, the impeller can be designed with codes that solve the meridional flow field through the use of quasi-three-dimensional methods. In addition, the impeller efficiency can be estimated using simple models and typical specific speed charts for similar components found in other compressors. The rotation of the shroud can be simulated with simple stress models. Approximate velocity distributions can be produced using assumptions, e.g., Stanitz Approximation, which are asymptotically correct in the limit of a large number of impellers, i.e., greater than eight impellers. A finite-element analysis also can be made of the entire configuration to determine the maximum stress of each configuration.

Thus, given the description of the parameters of the new filter compressor, the general shape and estimated design performance for a given configuration can be predicted as described herein.

Typically, centrifugal compressors create higher air compression but generate lower air flow capacity over the mirror surface. Thus, centrifugal compressors are often used with slower rotation speeds and larger mirrors. An axial or radial flow compressor, however, creates less air compression but generates higher air flow over the mirror surface. Thus, axial or radial flow compressors are well suited for systems using high rotation rates and small mirrors.

Figure 6A:
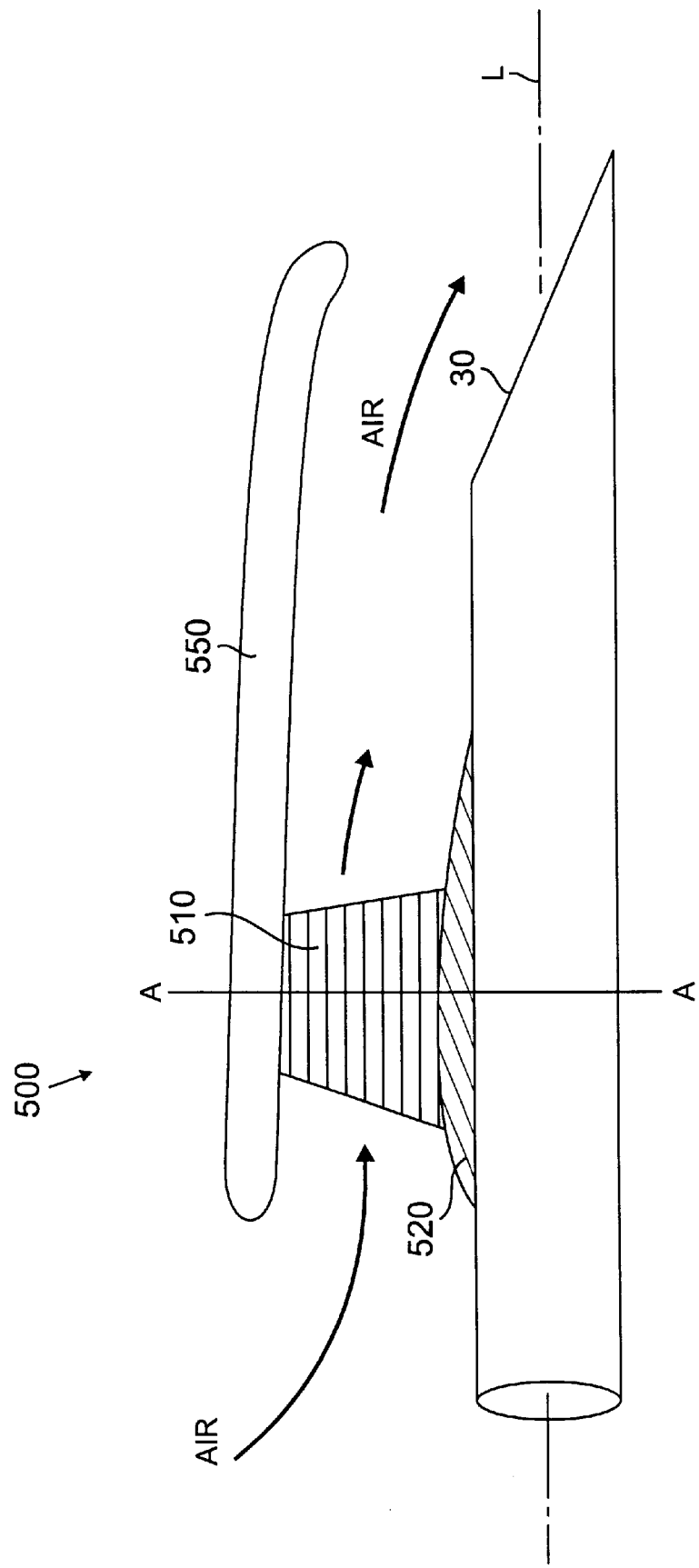
FIG. 6A is a cross-sectional view of a self-cleaning mirror including a filter impeller compressor.
Figure 6B:
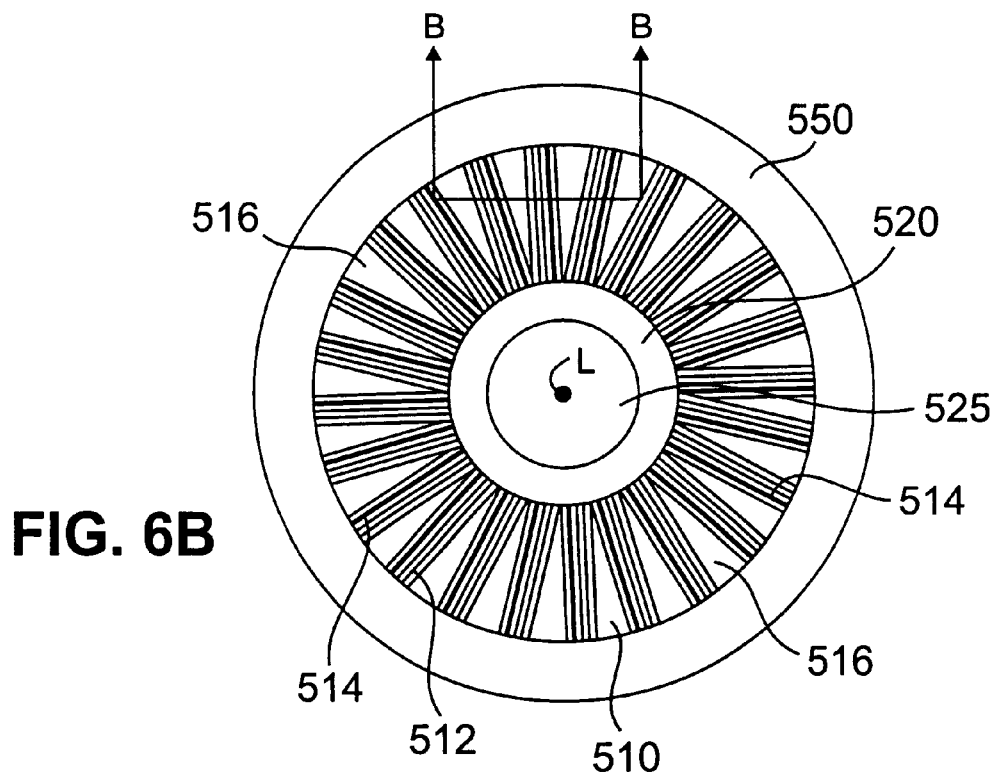
FIG. 6B is an end on, cross-sectional view of the filter impeller compressor of FIG. 6A taken along section AA.
Figure 6C:
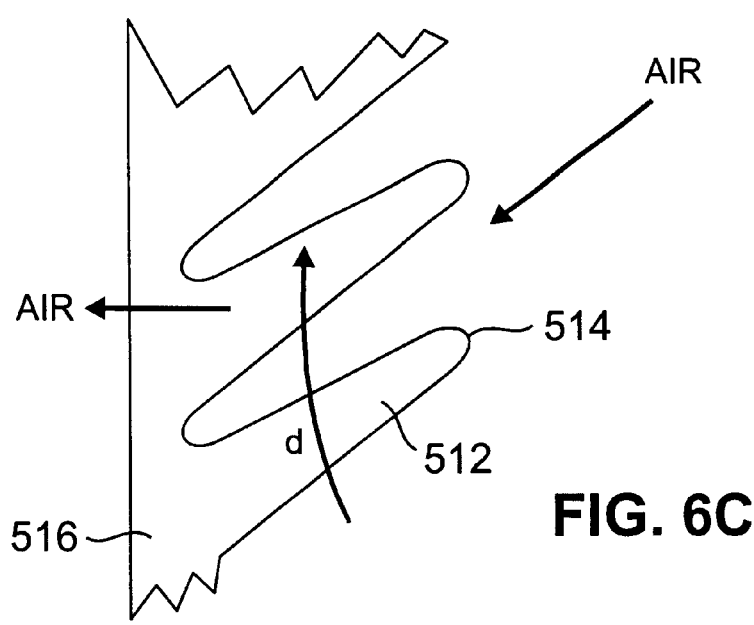
FIG. 6C is a cross-sectional view of the filter impeller compressor of FIG. 6A taken along section BB.

Referring now to FIG. 6A, filter compressor 500 includes impeller disk 520, shroud 550, and filter impeller 510. As shown in FIG. 6B, a series of louvered fingers 512 are attached to a base 516 of the filter impeller 510. Louvered fingers 512 (FIG. 6C) extend radially from cylindrical shaft 525 and ends 514 of the impellers are oriented radial to longitudinal axis (L) to help push air into the compressor. Filter impeller compressors also can be formed in standard configurations, including, for example, axial-flow compressors. Unlike the other filter compressors mentioned above in which air is compressed and then filtered, filter impeller 510 not only functions to propel air between impeller disk 520 and shroud 550 but also to filter out particulates from the incoming air. Thus, in a filter impeller compressor, the air is cleaned prior to and during compression.

Figure 7:
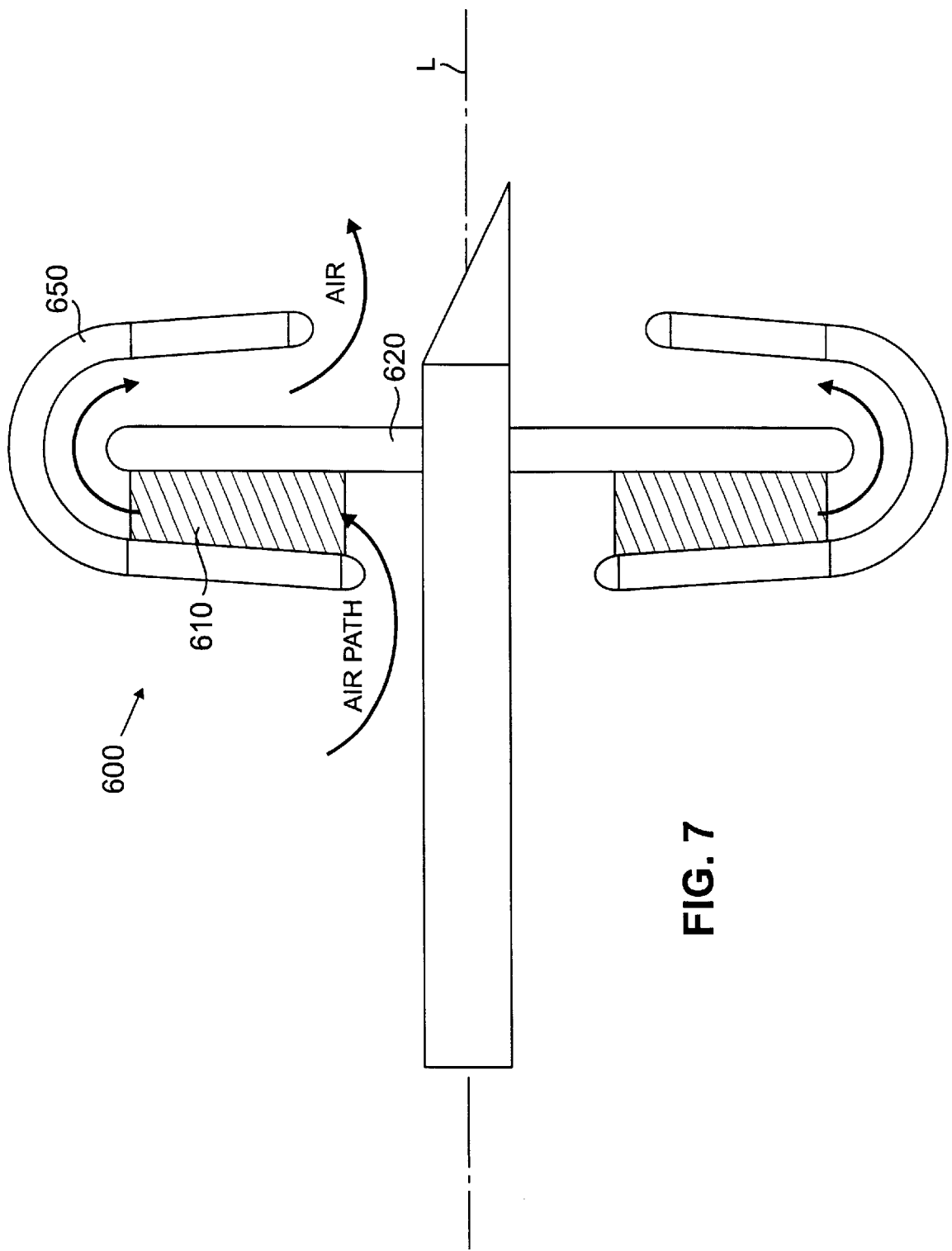
FIG. 7 is a cross-sectional view of a self-cleaning mirror including a porous filter impeller compressor.

FIG. 7 shows a centrifugal filter impeller compressor 600 including a porous filtering disc 610. As the porous disc rotates, air is compressed through the air drag on the porous material. A centrifugal filter impeller compressor is similar to viscous drag pumps.

All of the filter compressors described above also can be categorized as shrouded compressors. In general, the shroud limits the tip speed of the compressor due to the stresses that occur in the shroud during rotation. In most cases, the peak stress occurs at the flow inlet to the shroud. In normal industrial centrifugal compressors, the tip speed of a shrouded impeller is usually limited to approximately 1250 ft/sec. In normal aircraft components, unshrouded axial-flow compressors have a limit of about 1400 ft/sec. Adding a shroud to this configuration can limit the achievable tip speed to lower values. Industrial axial compressors, however, are generally designed with a lower tip speed, i.e., a subsonic Mach number relative to the blade. This limits the tip speed to about 800 ft/sec. Tip speeds of 1000 ft/sec, for example, are approximately equivalent to 40,000 RPM for a 6 inch diameter shroud.

Higher tip speeds, however, can be produced by the use of low-specific-speed impellers and stationary shroud compressors.

Figure 8:
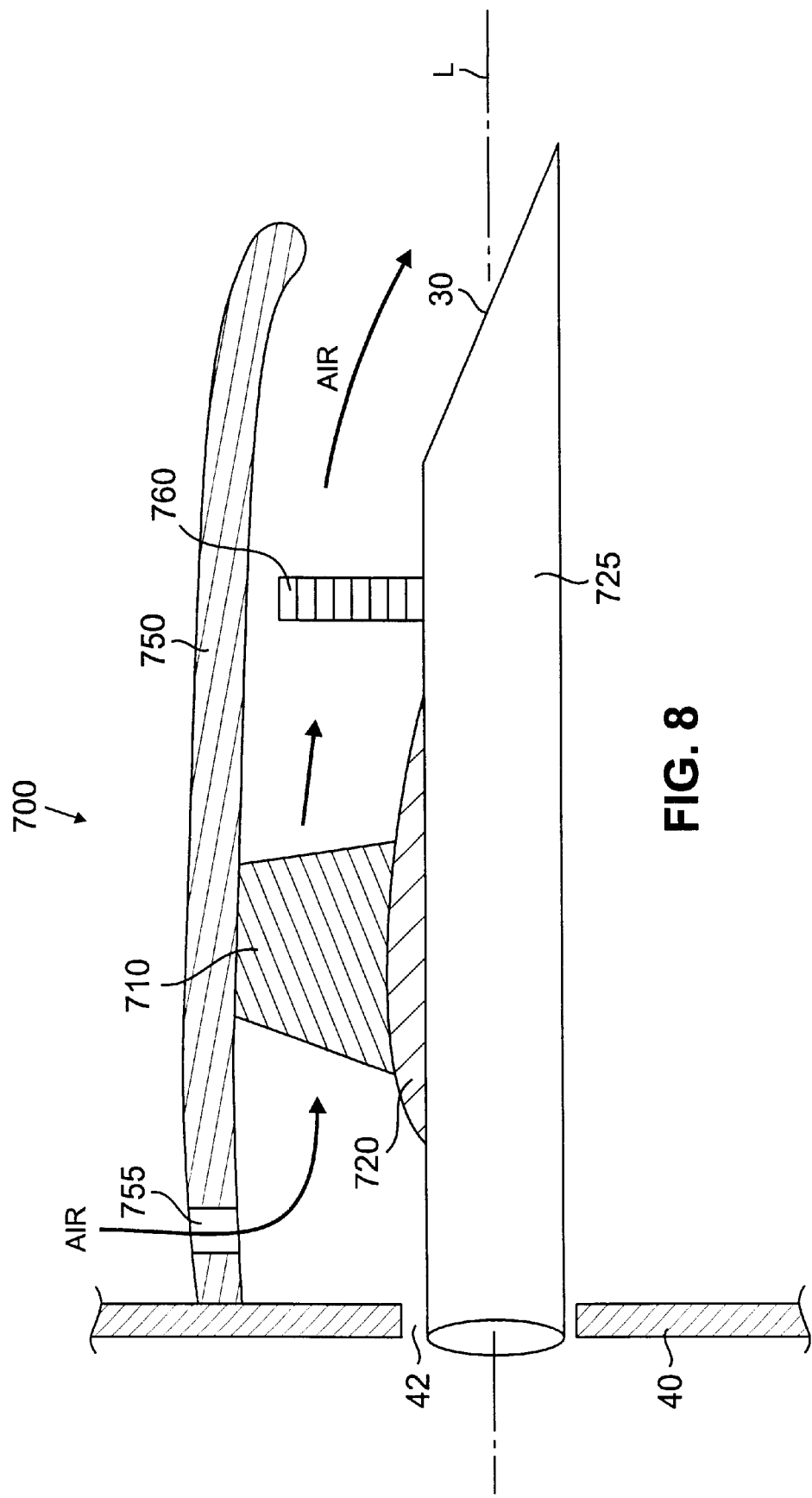
FIG. 8 is a cross-sectional view of a self-cleaning mirror including a axial flow compressor with a stationary shroud.
Figure 9:
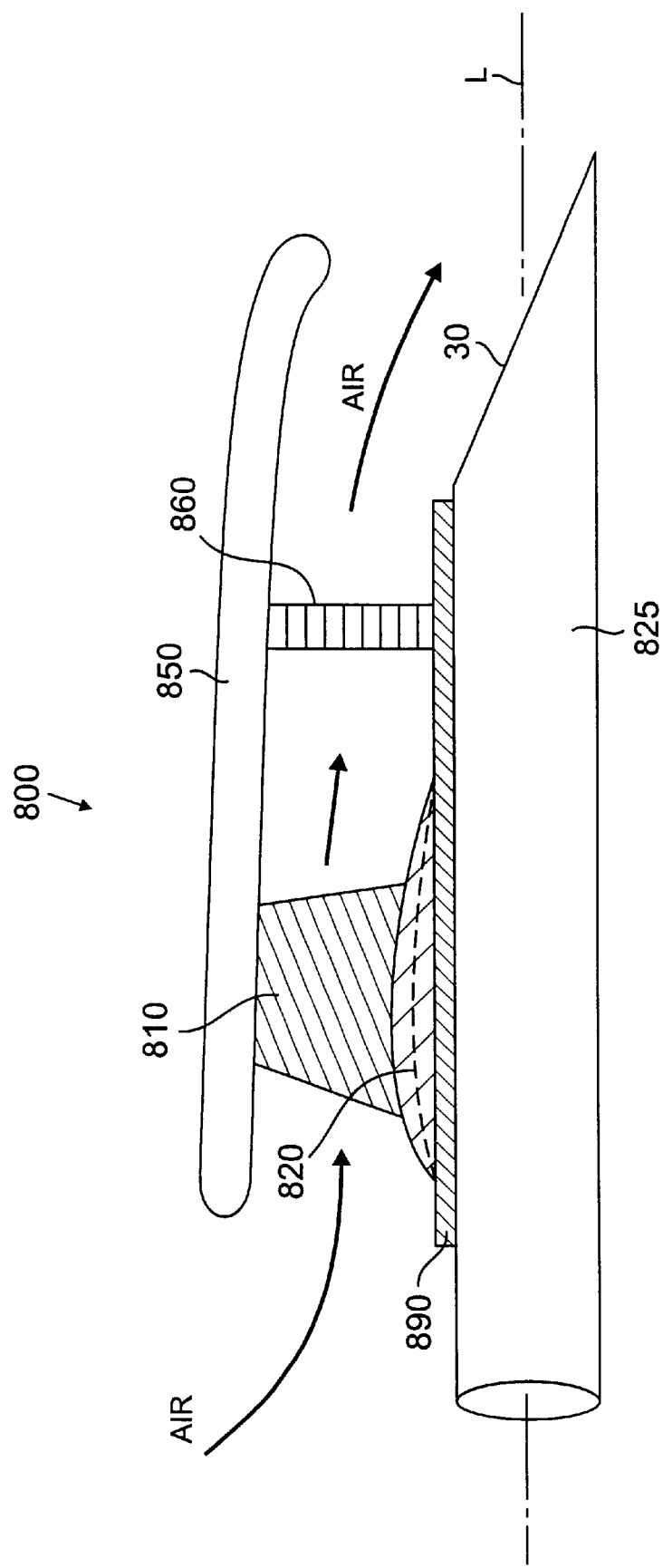
FIG. 9 is a cross-sectional view of a self-cleaning mirror including an axial flow compressor with a pseudo-stationary shroud.

As shown in FIG. 8, a stationary shroud compressor 700 includes stationary shroud 750, impeller disk 720, blades 710, and filter assembly 760. Stationary shroud 750 is attached to support housing 40 of motor 105 (not shown). In operation, stationary shroud 750 does not rotate. However, cylindrical shaft 725, blades 710, impeller disk 720, and filter assembly 760 all rotate about longitudinal axis L causing air to be drawn in through vents 755 of stationary shroud 750. Since a stationary shroud is not rotated and thus not subjected to rotational stress, the stationary shroud allows the mirror assembly to rotate faster.

Alternatively, a self-cleaning mirror assembly also can be rotated faster by using a pseudo-stationary shroud. As shown in FIG. 9, pseudo-stationary shroud compressor 800 includes impeller disk 820 and filter assembly 860 attached to a slip mechanism 890, e.g., ball bearings or a liquid bearing. In operation, shroud 850, cylindrical body 825, blades 810, impeller disk 820, and filter assembly 860 all rotate about longitudinal axis L. In this configuration, however, slip mechanism 890 allows filter compressor 800, i.e., blades 810, impeller disk 820, filter assembly 860, and shroud 850, to rotate slower than the rest of the compressor. Thus, the shroud is not subjected to high rotational stresses and the mirror assembly can be rotated faster.

The invention is further described in the following examples, which do not limit the scope of the invention described in the claims.

EXAMPLES

The tables below are the results of calculations indicating a possible range of speeds and component performances available for different compressor configurations, i.e., shroud outer diameters.

The optimal performance of a compressor is expressed in terms of a dimensionless quantity referred to as specific speed $N_s$. $N_s$ is dependent on flow capacity, rate of rotation of the impeller and the pressure rise at the compressor exit. See for example "Fluid Flow" by Sabersky, Acosta, and Hauptmann (1989), and "Engineering Hydraulics" edited by Rouse (1950), both of which are herein incorporated by reference in their entirety. In each table, $N_s$ is assumed to have specific speeds for which each compressor will have optimal performances. The specific speeds and optimal performances for different compressor configurations can be estimated, for example, by using Figure 12.34 from Chapter 12 at page 452 of "Fluid Flow." For example, a centrifugal compressor has an optimal performance when the specific speed is in the range between about 0.3 to about 0.7. The tip-speed is calculated assuming that the compressor inlet has a specific tip radius of about 3 to about 4 inches. The static pressure increase is the net pressure rise at the compressor outlet and is obtained by assuming 50% efficiency for the compressor. The outer shroud diameter is estimated based on the fact that a centrifugal compressor blade has a typical aspect ratio of about 5. Finally, the flow capacities can be obtained by using the definition of specific speed and the assumed values for specific speed and static pressure increase. A definition of specific speed can be found, for example, in section 12.8 of "Fluid Flow."

The compressor has 16 blades oriented with respect to an incoming air flow such that the blades at the leading edge of the compressor have a minimum incidence relative to the air flow. Typically, depending on the compressor design, the blade has a backslope in the range between 25 degrees to 55 degrees, measured from the radial direction. The impeller tip diameter depends on the requirements of each type of compressor. Typically, it is approximately 5.75 inches for a specific speed of 0.7 with the outer shroud diameter at approximately 7.2 inches. The shroud extends beyond the impeller tip and provides sufficient room to change the direction of the flow exiting from the impeller, such as with a nozzle.

Standard filters, such as paper and polymer filters, have pressure drops between about $5 \times 10^{-3}$ psi to about 0.1 psi. The values in each table indicate that each compressor configuration can provide a pressure increase for passing ambient air through a filter to generate a stream of clean air around the rotating mirror. As shown below, the centrifugal compressor (Table 1) has a higher static pressure increase than the axial (Table 2) and radial (Table 3) compressors. Thus, a centrifugal compressor can create a greater pressure increase and could be used with thicker filters having a larger pressure drop.

Example 1
Centrifugal Compressor Calculations

The results of calculations based upon a centrifugal compressor with a 1.5 inch diameter cylindrical shaft at ambient air conditions are presented in Table I.

TABLE I

Centrifugal Compressor Parameters

| Specific Speed | Shaft Speed (Rpm) | Assumed Tip-Speed limit (ft/sec) | Static Pressure Increase (psi) | Outer Shroud Diameter (in) | Flow Capacity (CFM) |
|---|---|---|---|---|---|
| 0.7 | 40,000 | 1250 | 1.1 | 7.2 | 675 |
| 0.5 | 40,000 | 1400 | 1.6 | 8 | 475 |
| 0.3 | 40,000 | 1500 | 1.8 | 8.6 | 200 |

Example 2
Axial Flow Compressor Calculations

The results of calculations based upon an axial flow compressor with a 1.5 inch diameter cylindrical shaft at ambient air conditions are presented in Table II. The axial flow compressor is designed with the criteria discussed above.

TABLE II

Axial Compressor Parameters

| Specific Speed | Shaft Speed (Rpm) | Assumed Tip-Speed limit (ft/sec) | Static Pressure Increase (psi) | Outer Shroud Diameter (in) | Flow Capacity (CFM) |
|---|---|---|---|---|---|
| 3.0 | 40,000 | 1000 | 0.24 | 5.75 | 1700 |

Example 3
Radial Flow Compressor Calculations

The results of calculations presented in Table III are based upon a radial flow compressor with a ⅕ inch diameter shaft at ambient temperatures. The radial flow compressor is designed with the criteria discussed above.

TABLE III

Radial Compressor Parameters

| Specific Speed | Shaft Speed (Rpm) | Assumed Tip-Speed limit (ft/sec) | Static Pressure Increase (psi) | Outer Shroud Diameter (in) | Flow Capacity (CFM) |
|---|---|---|---|---|---|
| 0.3 | 40,000 | 1,000 | 0.20 | 5.75 | 1,250 |

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A self-cleaning mirror comprising:
    a cylindrical shaft comprising a mirror face, and
    a compressor assembly including a shroud, wherein the compressor assembly is arranged on the cylindrical shaft near the mirror face, such that rotation of the shaft causes air to be compressed by the compressor assembly and the shroud directs the compressed air to flow over the mirror face.

2. The self-cleaning mirror of claim 1, wherein the compressor assembly includes a filter.

3. The self-cleaning mirror of claim 1, wherein the compressor assembly comprises a centrifugal compressor.

4. The self-cleaning mirror of claim 1, wherein the compressor assembly comprises an axial flow compressor.

5. The self-cleaning mirror of claim 1, wherein the compressor assembly comprises a radial flow compressor.

6. The self-cleaning mirror of claim 1, wherein the compressor assembly comprises a mixed flow compressor.

7. The self-cleaning mirror of claim 1, wherein the compressor assembly comprises a filter impeller compressor including an impeller disk and a plurality of blades made from a filter material.

8. The self-cleaning mirror of claim 7, wherein the filter impeller compressor has an axial flow configuration.

9. The self-cleaning mirror of claim 7, wherein the filter impeller compressor has a centrifugal flow configuration.

10. The self-cleaning mirror of claim 7, wherein the filter impeller compressor has a radial flow configuration.

11. A method of improving rotating mirror performance by inhibiting particle deposition, the method comprising:
    providing a mirror assembly including a shaft having a mirror face;
    attaching a compressor assembly including a shroud to the shaft near the mirror face; and
    rotating the mirror assembly and compressor assembly to cause air to be compressed and filtered, wherein the shroud directs the compressed and filtered air to flow over the mirror thereby improving rotating mirror performance.

12. A self-cleaning mirror comprising:
    a cylindrical shaft comprising a mirror face disposed on an end thereof; and
    a compressor assembly arranged on the cylindrical shaft proximal to the mirror face, the compressor assembly including an impeller disk, a plurality of blades, and a filter, wherein the impeller disk, the plurality of blades, and the filter are fixed about the circumference of the cylindrical shaft.

13. The self-cleaning mirror of claim 12, wherein the compressor assembly further includes a shroud attached to the plurality of blades.

14. The self-cleaning mirror of claim 12, wherein the compressor assembly comprises a centrifugal compressor.

15. The self-cleaning mirror of claim 12, wherein the compressor assembly comprises an axial flow compressor.

16. The self-cleaning mirror of claim 12, wherein the compressor assembly comprises a radial flow compressor.

17. The self-cleaning mirror of claim 12, wherein the compressor assembly comprises a mixed flow compressor.

18. The self-cleaning mirror of claim 12, further comprising a motor including a drive mechanism and a housing, wherein a first end of the cylindrical shaft is connected to the drive mechanism.

19. The self-cleaning mirror of claim 18, wherein the compressor assembly further includes a shroud attached to the motor housing.

20. The self-cleaning mirror assembly of claim 18, wherein the compressor assembly is a centrifugal compressor.

21. The self-cleaning mirror assembly of claim 18, wherein the compressor assembly is an axial flow compressor.

22. The self-cleaning mirror assembly of claim 18, wherein the compressor assembly is a radial flow compressor.

23. The self-cleaning mirror assembly of claim 18, wherein the compressor assembly is a mixed flow compressor.

24. The self-cleaning mirror of claim 12, wherein the compressor assembly further comprises a shroud and a slip mechanism, the shroud resting on the slip mechanism which is fixed to the cylindrical shaft.

25. The self-cleaning mirror of claim 12, wherein the compressor further comprises a shroud fixed to the plurality of blades.

26. The self-cleaning mirror assembly of claim 25, wherein the shroud is fixed to the impeller disk.

27. The self-cleaning mirror assembly of claim 12, wherein the plurality of blades are oriented perpendicular to the shaft.

28. A self-cleaning mirror comprising:
   a cylindrical shaft comprising a mirror face; and
   a compressor assembly comprising a filter impeller and a shroud, wherein the compressor assembly is attached about the circumference of the cylindrical shaft near the mirror face and the shroud directs compressed air to flow over the mirror face as the shaft rotates.

* * * * *